United States Patent [19]
Bonifas et al.

[11] Patent Number: 6,050,487
[45] Date of Patent: *Apr. 18, 2000

[54] CARD READER FOR GAME MACHINE

[75] Inventors: Corinne Bonifas, Gemenos; Jean-Jacques Foglino, Peynier; Alain Nicolai, Allauch, all of France

[73] Assignee: Gemplus, Gemenos, France

[*] Notice: This patent issued on a continued prosecution application filed under 37 CFR 1.53(d), and is subject to the twenty year patent term provisions of 35 U.S.C. 154(a)(2).

[21] Appl. No.: 08/793,782

[22] PCT Filed: Aug. 31, 1995

[86] PCT No.: PCT/FR95/01137

§ 371 Date: Apr. 30, 1997

§ 102(e) Date: Apr. 30, 1997

[87] PCT Pub. No.: WO96/07164

PCT Pub. Date: Mar. 7, 1996

[30] Foreign Application Priority Data

Aug. 31, 1994 [FR] France .................... 94 10501

[51] Int. Cl.[7] ........................................ G06F 17/00
[52] U.S. Cl. ...................... 235/375; 235/380; 902/26
[58] Field of Search .................... 235/380, 379, 235/382, 375; 902/26, 23

[56] References Cited

U.S. PATENT DOCUMENTS

| 3,731,076 | 5/1973 | Nagata et al. | 235/61.7 |
| 3,850,299 | 11/1974 | Kreitzer | 209/73 |
| 4,575,622 | 3/1986 | Pellegrini | 235/382 |
| 4,864,114 | 9/1989 | Briane et al. | 235/480 |
| 5,179,517 | 1/1993 | Sarbin et al. | 235/380 |
| 5,515,010 | 5/1996 | Takemoto et al. | 235/380 |
| 5,559,312 | 9/1996 | Lucero | 235/375 |
| 5,575,374 | 11/1996 | Orus et al. | 194/213 |
| 5,659,166 | 8/1997 | Mori et al. | 235/380 |
| 5,697,482 | 12/1997 | Orus et al. | 194/213 |

FOREIGN PATENT DOCUMENTS

| 0534718 A2 | 3/1993 | European Pat. Off. | 235/375 |
| 2691561 | 11/1993 | France . | |
| U-9201899 | 7/1992 | Germany . | |
| WO 94/16416 | 7/1994 | Netherlands . | |
| 2018484 | 10/1979 | United Kingdom . | |
| 0513847 | 11/1992 | United Kingdom . | |

*Primary Examiner*—Michael G Lee
*Assistant Examiner*—Diane I. Lee
*Attorney, Agent, or Firm*—Nilles & Nilles, SC

[57] ABSTRACT

Card reader for game machine with a memory (42) which contains a minimum credit value and receives the credit value available from a card. At each stage of the game, the available credit value varies. The available credit value is compared, on each transaction, with the minimum value. When the available credit value is less than the minimum value, a circuit (47) triggers seizure of the card. A reader of this type can operate by performing all transactions in a memory within the reader, only reading the card memory when the card is inserted into the reader and updating it when the card is ejected.

8 Claims, 3 Drawing Sheets

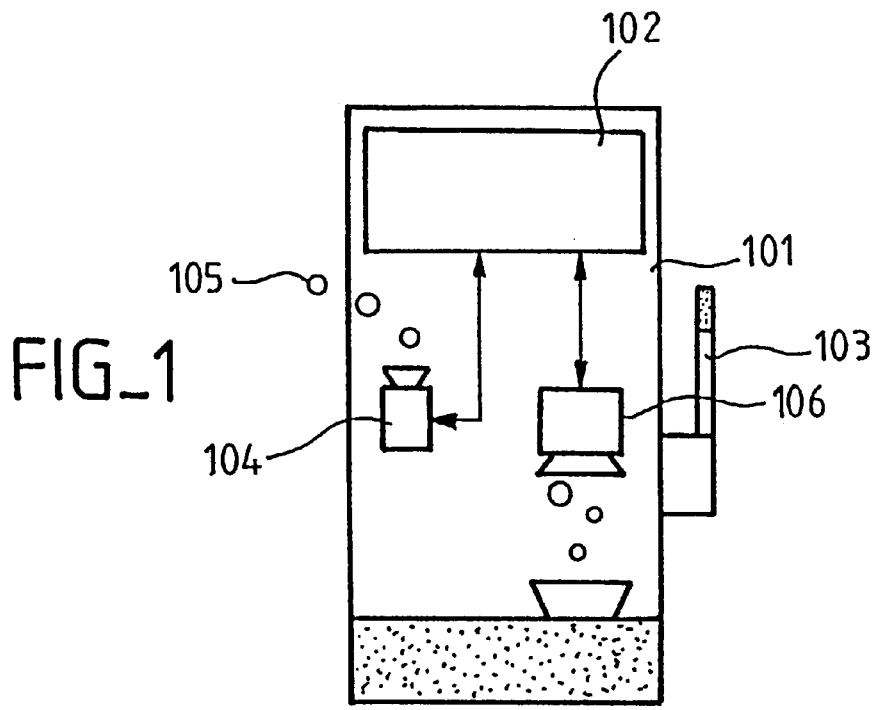
FIG_1
PRIOR ART
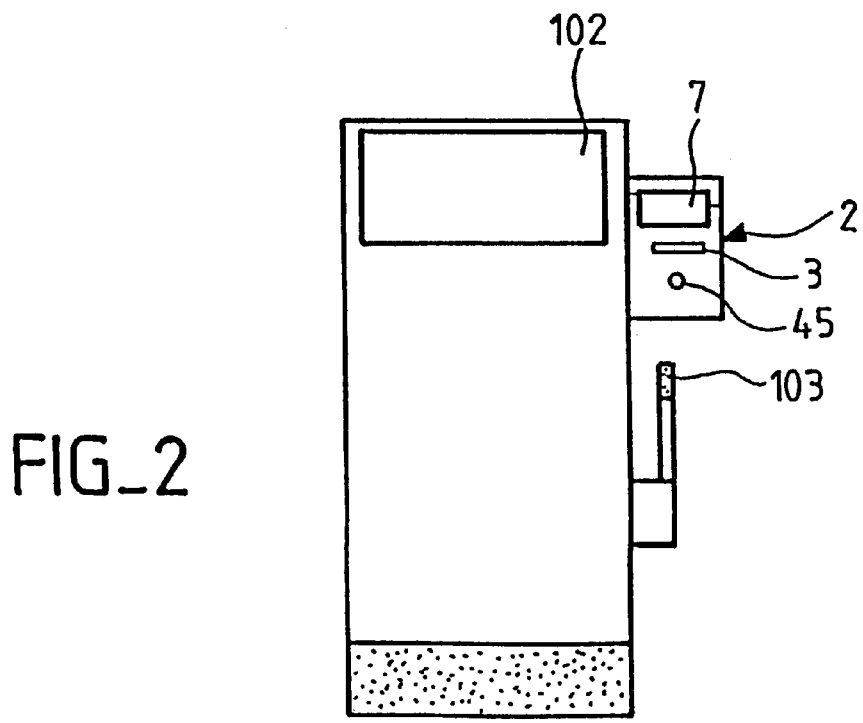
FIG_2

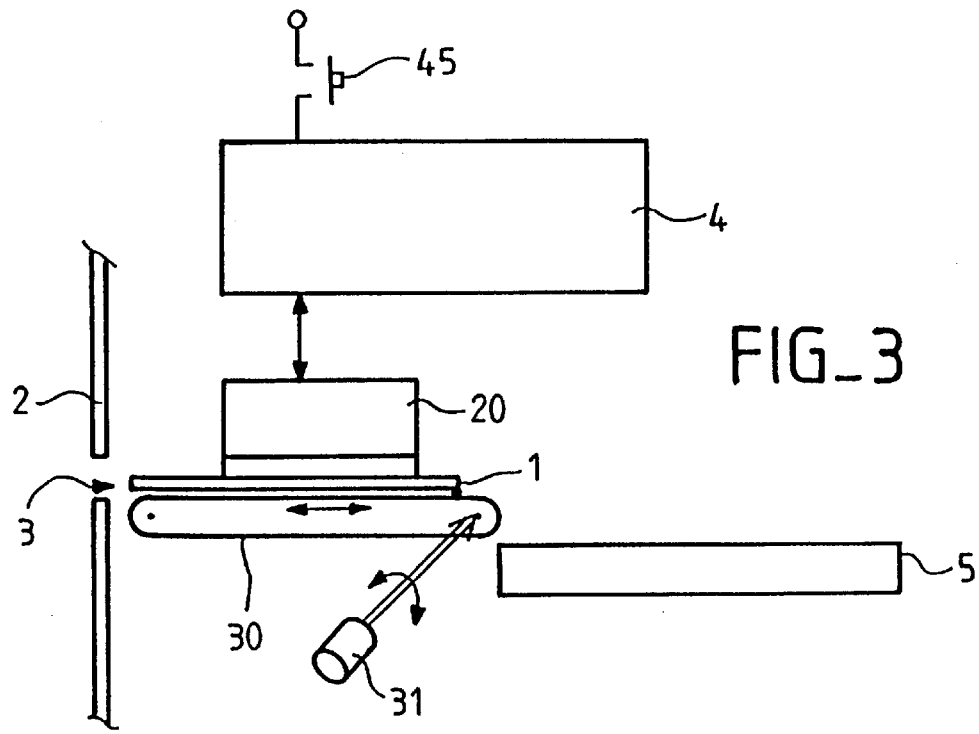
FIG_3
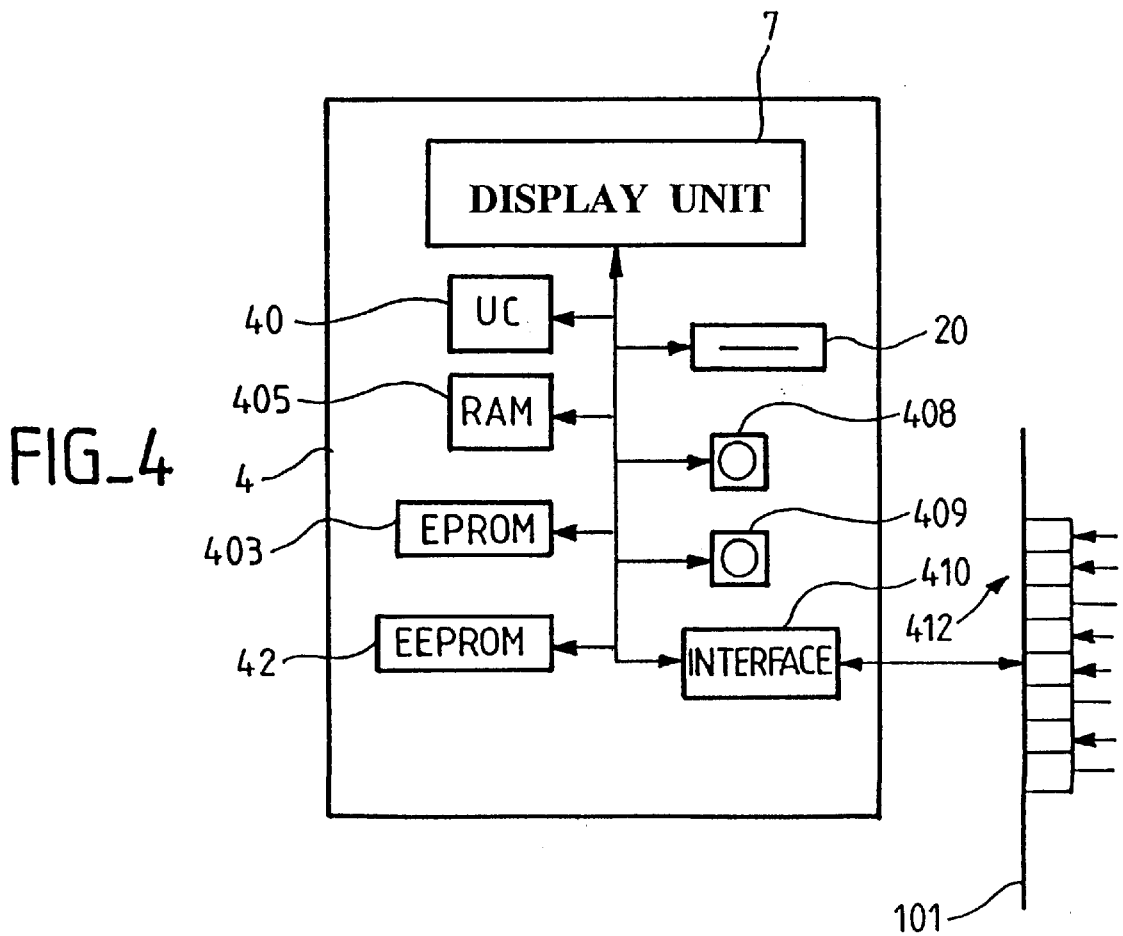
FIG_4

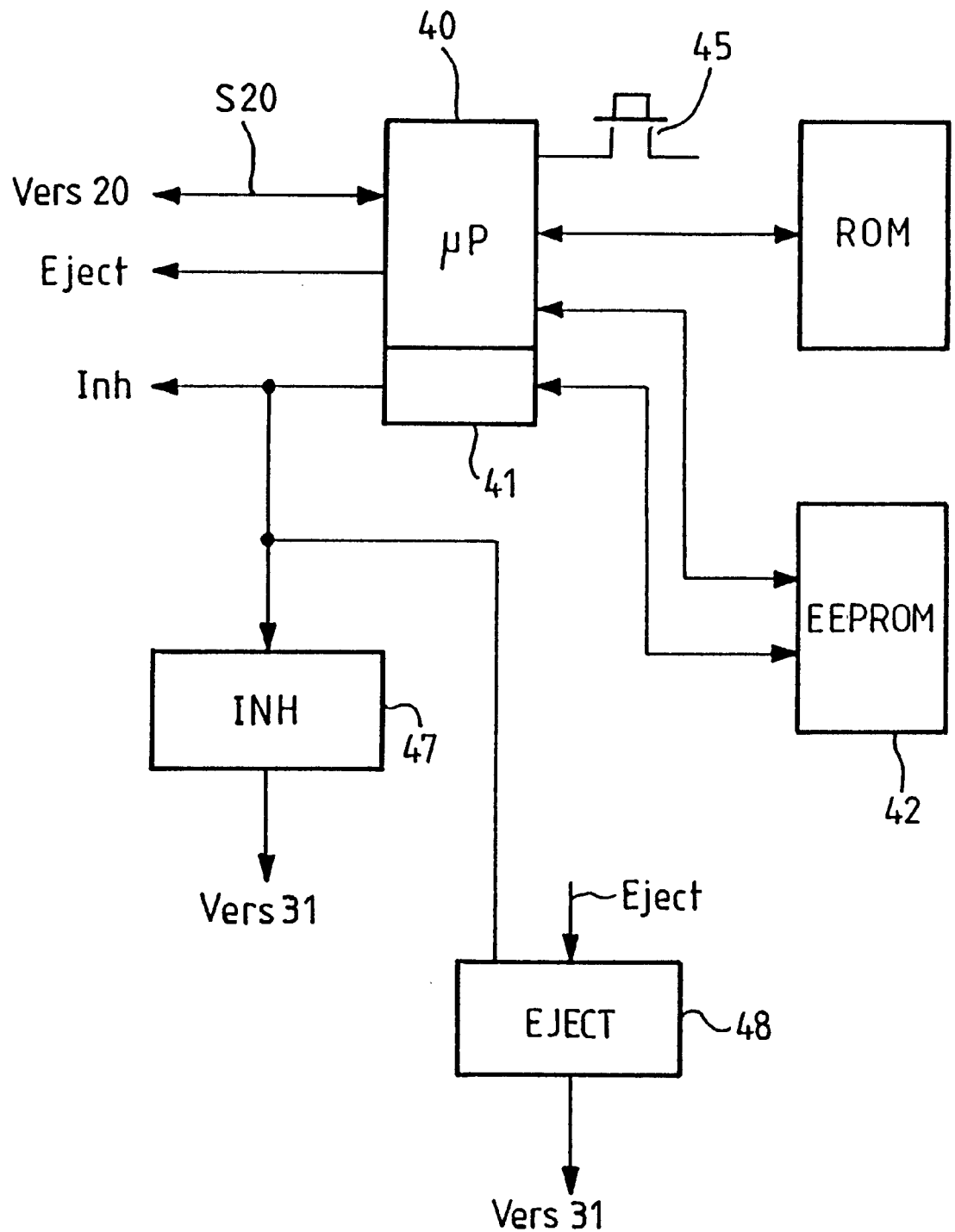

CARD READER FOR GAME MACHINE

BACKGROUND OF THE INVENTION

The invention relates to a card reader for a games machine and especially to a chip card reader that can be used to test the contents of the card in order to enable the user to use it in the games machine or recover it when he wishes to stop playing.

In casinos and as a general rule in gaming rooms, games machines are used that work with coins or tokens that the user purchases at the cashier's desk.

A standard games machine is like the one shown in FIG. 1. It has a body or body-frame 101 provided with a window 102 or a display screen with which the user can be shown the parameters of the game. The machine may have an arm 103 or a control button, not shown, that can be used to start play. For example, this command may cause symbols to flow across the screen. The turn is won if the symbols form a winning combination and if not it is lost.

To be able to start play, the player must put one or more tokens 105 in a paying mechanism 104. When the turn is won, a feeder box 106 releases a certain number of tokens that corresponds, according to the rules of the game, for example to n times the amount of the wager.

The tokens at present are most usually metal tokens which may have different colors and diameters corresponding to different face values. They may also be made of materials of different natures. In order that the payment mechanism 104 may be able to distinguish between them, it is then necessary to use the magnetic signature given by the materials of different natures and/or different dimensions. The old practice of using coins instead of tokens is sometimes still used.

Apart from possible attempts at fraud, the use of tokens is not practical. It calls for the presence of relatively large numbers of staff in a central cashier's desk and accounting operations that could give rise to errors or even fraud. Furthermore, the use of tokens slows down the use of the machine and limits the amount of money that can be wagered.

It can be seen that a more modern system is replacing the use of tokens. However, to avoid upsetting the habits of the players and in order to preserve certain socially convivial aspects of the machine, the use of tokens is not being completely abandoned.

For this purpose, systems of cards such as chip cards are used. The games machine should therefore have a card reader that can read the contents of the card, namely the available sum of money memorized in the card which should be capable of processing the transactions made by the games machine at the user's request and which should be capable, after transaction, of making a recording in the card of the newly available sum.

However, these cards have a certain cost and when the amount of money recorded in the cards has been used up and the cards can no longer be used in their state, the owner of the games machine may need to recover them in order to reuse them.

OBJECTS AND SUMMARY OF THE INVENTION

The invention therefore relates to a chip card reader for a games machine capable of carrying out debit or credit operations on the monetary contents recorded in a chip card according to the wagers and gains made by a player. The reader comprises, for this purpose, a central processing unit, an associated program memory and at least one electrically re-recordable memory, characterized in that it further comprises:

means to compare the amount of money available at the end of a game with that of a given minimum monetary value, delivering a rejection signal when this available amount is smaller than or equal to the minimum value, means to swallow up the card that are controlled by this rejection signal.

Furthermore, the invention provides for the reduction of the number of times that the memory of the chip card is accessed in order to limit its wear and tear.

According to the invention therefore, it is provided that:

after the insertion of a card into the reader, the money value recorded in the card is transferred into the re-recordable memory;

the central control unit updates the contents of the re-recordable memory, at each game played, as a function of the wages and gains made;

at the end of the game, the card restitution device activates the transfer, to the card, of the updated contents of the re-recordable memory and then, if the amount available is greater than the minimum value, it activates the restitution of the card to the player.

BRIEF DESCRIPTION OF THE DRAWINGS

Other particular features and advantages of the invention shall appear clearly in the following description given by way of a non-restrictive example with reference to the appended figures, of which:

FIG. 1 shows a games machine according to the prior art, already described here above;

FIG. 2 shows a games machine according to the invention;

FIG. 3 shows an exemplary circuit of the card reader according to the invention;

FIG. 4 shows circuits of the reader more specific to the invention.

FIG. 5 shows an organization of more specific circuits used to implement the invention.

DETAILED DESCRIPTION OF THE PREFERRED EMBODIMENTS

The games machine according to the invention shown in FIG. 2 is essentially identical in its appearance and in its operation to the standard machine shown in FIG. 1. Indeed, it is very important not to disturb the player in his habits.

FIG. 2 does not show the means that can be used to make the games machine function with tokens, but these means could exist and coexist in order to work with the card reader according to the invention.

The card reader 2 which enables the machine to be made to work by means of a "chip" card is preferably fixed to the right-hand side of the machine at an appropriate height so that a chip card can easily be inserted into the input slot 3 of the reader 2 and so as to enable the reading of the indications of a display device 7 with which this reader is provided. This device is used to indicate various data elements, especially the amount of the balance. The reader also has a means, such as a button 45, to activate the restitution of the card. The reader 2 may also be integrated into the machine.

So-called "chip" cards are currently well known in the prior art. There are two major groups of such cards, namely prepayment cards, used for example in telephone booths, and bank cards.

The chip card used in the games machine according to the invention will preferably have an external and electrical form identical to that of presently standardized cards, such as the prepayment cards or re-chargeable cards that are available in the market and that will make it possible, in particular, to totalize the gains coming from the wagers won. It will be possible however to provide for the use of any type of appropriate card, especially cards presently designed to play the role of electronic wallets which are particularly designed so that they can be replenished in an appropriate reader.

FIG. 3 gives a schematic view of the system for inserting a card into the reader and extracting it.

The reader 2, on its front face, has the input slot 3 behind which there is a card-grasping system such as a small conveyer belt 30 or a roller system which, by friction or clamping, takes charge of a card 1 that is inserted through the slot 3. A control system 31 such as a motor activates the motion of the device 30 so that it places the card in position before a read/write interface 20. A system of this kind is known in the prior art.

With the card in position before the read/write interface 20, this interface reads the contents of a memory possessed by the card and transmits these contents to the circuit 4 of the reader. The contents correspond to a sum of money that the user will be able to wager in the games machine.

The system of FIG. 3 also has a button 45 that can be activated by the user and enables the transmission of a signal to the circuit 4 so that this circuit commands the device 21 and the grasping device 30 to eject the card 1 through the slot 3 in order to return it to the player.

At the far right of the grasping device 30, there is a bin 5 that is used to receive the cards under conditions of operation that shall be explained here below.

FIG. 4 shows the circuits 4 of the reader. The circuits are very similar to those of the chip card readers such as bank cash dispensers for example.

They comprise essentially a central processing unit such as a microcontroller 40 that manages all the operations. This microcontroller is connected by a bus to a program memory 403, of the EPROM type for example, a second memory 42 of the EEPROM type for example that can be used to store a certain number of parameters which are likely to change such as the amount of money wagered and a third RAM type memory 405 acting as a random-access memory for the performance of the program of the microcontroller.

The memory designed to record the amount of money wagered changes constantly during the games played by the user and this memory 42 could be of another type than an EEPROM memory.

The microcontroller may, if necessary, be connected to an RTC (real time clock) circuit and to a safety module that comprises a DES or RSA diversification algorithm.

The bus is also connected to the display unit 7 used in particular to display the sums wagered, the gains obtained and the remaining sums. It is connected to the read/write interface 20 designed to transfer information to/from the card 1 of the player and possibly to/from the cards intended for staff to intervene for example on the parameters of the payment system (in particular the value associated with the minimum and maximum buttons). Finally, the bus is connected to a number of control buttons, in this case two buttons 408 and 409. These buttons in this exemplary embodiment are used by the players to make wagers. The first button corresponds for example to the minimum wager and the second to the maximum wager. Finally, in the reader, there are a certain number of interfaces designed to connect it to the exterior. In this exemplary embodiment, there is an interface 410 designed to connect it to the games machine.

The interface 410 enables the decoding of the instructions that appear on the bus designed for the games machine. The physical interface designed to be connected to the games machine takes the form of a connector 412 comprising a set of pins used to send out and to receive the signals to/from the games machine.

The signals that appear at this connector 412 will be determined by instructions flowing in the bus of the reader and decoded by the interface 410. These instructions will themselves be determined by the working program laid out in the memory 403. The program and the interface comprising the connector 412 are adapted to the types of machines used. In the exemplary embodiment described, the machine meets the specifications of the machines currently existing on the market.

FIG. 5 shows an organization of more specific circuits used to implement the invention.

The microcontroller 40 or microprocessor $\mu$P has ports S20 connected to the read/write device 20. At these ports, it receives the value of the amount available in the card. It sends this value to the memory 42.

At each transaction, the memory 42 sees this value modified by the microcontroller 40.

Furthermore, the memory 42 is designed to contain a minimum value (0 for example) below which the user can no longer use his card and below which he must be prohibited from continuing to play. At each transaction, the modified value of the available amount is compared with this minimum value in a comparator 41 which may be a wired logic circuit of the microcontroller 40 or a program contained in the ROM and performed by the microcontroller. If the available amount is smaller than the minimum value, the circuit 41 sends out a rejection signal and activates a confiscation control circuit 47 which commands the card-grasping device to route this card to a confiscation zone 5 (see FIG. 3). According to the operating mode of the reader, this confiscation may also be decided upon when the available amount is equal to the minimum value.

The circuit 41 also inhibits a restitution circuit EJECT 48 activated by the button 45, the role of which is to normally activate the restitution of the card to the user by the device 30.

When a player desires to use the reader 2, he inserts his card 1 into the slot 3 of the reader 2. This insertion launches the operation of the reader. The contents of the card 1 are then transferred to the memory 42. These contents are checked in order to validate their existence and their amount. This validation will make it possible, for example, to eliminate counterfeit cards or cards belonging to persons recorded in a black list that prohibits them from playing. It will be done by means of security recognition methods well known in the prior art.

When these controls have been performed and recognized to be valid, the microprocessor 40 displays the amount of the credit contained in the card on the display unit 7. The player then chooses the amount of the wager that he wishes to bring into play by pressing one of the two buttons 408 or 409. For intermediate wagers between the minimum wager and the maximum wager, the player can press the button 408 several times until he reaches the maximum wager. Certain machines prohibit maximum wagers by means of an inhibition signal sent by the machine. This action will be taken up on the display unit in various ways, for example by the display of the wager or of the decremented contents of the credit in the card, or both successively or simultaneously.

The player will then make the games machine work in an ordinary way, for example by activating the lever 103.

Depending on the result of the game, the reader receives a gain or a loss from the games machine. The microprocessor 40 updates the memory 42 by updating the amount remaining to the player's credit.

The value of the amount available is transferred to the comparison circuit 41 along with the minimum value that may be available. If the available amount is greater than the minimum value, the gain/loss obtained and/or the amount of the new credit is displayed on the display unit 406 and the player can once again play without having to recover tokens that would be redistributed if the machine were working with tokens.

It can be seen that it is possible to avoid loss of time as compared with the situation where tokens have to be obtained and put them back into the machine. The profitability of the machine is thus greatly improved.

If the available amount is smaller than the minimum value, the comparison circuit 41 puts out an inhibition signal Inh to the games machine. Furthermore, this signal is transmitted to the control circuit 47 which acts on the control device 31 to route the card towards the receptacle 5 internal to the reader.

If necessary, before this command, the microprocessor 40 may send the read/write interface 20 the newly updated amount so that it records it in the memory of the card 1.

When the user wishes to stop playing, he operates the button 45. This button applies a signal to the microprocessor 40. The microprocessor transfers the value of the available amount contained in the memory 42 to the read/write interface 20 through the link S20. This link records this new amount in a memory of the card 1. Furthermore, the microprocessor sends out a signal EJECT that is transmitted to the card restitution control device EJECT 48. This device activates the control means 31 to make the device 30 restitute the card through the slot 3 of the reader.

It must be noted that, during this operation triggered by the handling of the button 45, the available amount recorded in the memory 42 may be communicated to the comparison circuit 41 and compared with the minimum value. If the available amount is smaller than the minimum value and even, depending on the type of operation of the card, if there is equality, a rejection signal Inh may be emitted to prohibit the working of the circuit EJECT 48 and to activate the working of the device 47 with a view to keeping the card in the reader.

Here above, the minimum amount may be a zero value or the instructed value of the card.

The various transactions used by the cards of the players as well as a certain number of information elements pertaining to the game, among others the amounts distributed following the gain as explained further above, are stored in the memory 42 of the card reader. This makes it possible, at different times, for example at the end of the day, to collect this information with a view to performing checks and drawing up statistics. For this purpose, it is possible for example to use an additional interface, for example an RS232 serial line or an infrared system provided with an appropriate connector placed on the reader. Another approach consists in using a card known as MaxiCard (registered mark of the Applicant) with the manager of the games machine. This card is inserted into the reader which recognizes it and implements the program for the loading into the card of the data elements collected in the memories of the payment mechanism reader.

We claim:

1. A method of monitoring an amount of money stored in a chip card having a card memory, the chip card being used in conjunction with a games machine, the method comprising:

providing a chip card reader having a microcontroller; a program memory for storing a program for operating the games machine; a re-recordable memory for storing an amount of money available on the chip card; a random access memory for executing the program; a card grasping device; a read/write interface for transferring information between the chip card and said reader; and an ejection circuit for ejecting the chip card from the chip card reader in response to activation of an ejection button electrically coupled to said ejection circuit;

updating said available amount stored in said re-recordable memory each time a game ends in response to the outcome of the game;

comparing, automatically, said updated available amount with a predetermined minimum amount associated with the games machine;

transmitting the updated available amount to the card memory of said chip card;

generating a rejection signal when said available amount is less than said minimum amount;

disabling the ejection circuit in response to said rejection signal; and swallowing the chip card in response to said rejection signal.

2. The method of claim 1, further comprising the steps of:

generating an ejection signal in response to activation of the ejection button; and in response to said ejection signal, transferring, via said read/write interface, the available amount from said re-recordable memory to the chip card memory, and ejecting the chip card.

3. A chip card reader for monitoring an amount of money stored on a chip card, the chip card for use by a player in conjunction with a games machine, the reader comprising:

a central processing unit (CPU);

a program memory for storing a program for operating the games machine;

a re-recordable memory that stores an amount of money available on the chip card, said amount being dependent, upon the outcome of the game;

a random access memory for executing the program;

a card grasping device that manipulates the position of the card relative to the reader;

a controllable motor coupled to said card grasping device for controlling the card grasping device;

an ejection circuit electrically coupled to a manually operable ejection button, said ejection circuit for returning the chip card to the player in response to activation of said ejection button;

a comparison circuit that automatically compares, at the end of each game and in response to the outcome of the game, said available amount to a predetermined minimum amount associated with the games machine, and generating a control signal when said available amount is less than said predetermined minimum; and a confiscation control circuit that generates a confiscation signal in response to said control signal, and wherein said controllable motor is responsive to said confiscation signal to (1) disable said ejection circuit, and (2) cause said card-grasping device to swallow the chip card when said available amount is less than or equal to said predetermined minimum.

4. The chip card reader according to claim 3, further including a read/write interface, wherein said CPU is responsive to activation of said ejection button for transferring, via said interface, said available amount from said re-recordable memory to the chip card prior to returning the chip card to the player.

5. The card reader according to claim 3, further including a selection device for manually selecting an amount of money to be spent on a game.

6. The chip card reader according to claim 3, wherein said predetermined minimum amount is stored in said re-recordable memory.

7. The chip card reader according to claim 6, wherein said predetermined minimum amount equals zero.

8. The chip card reader according to claim 6, wherein said re-recordable memory is an EEPROM type.

\* \* \* \* \*